United States Patent [19]

Matsumoto

[11] Patent Number: 5,555,546
[45] Date of Patent: Sep. 10, 1996

[54] APPARATUS FOR DECODING A DPCM ENCODED SIGNAL

[75] Inventor: Ichiro Matsumoto, Sendai, Japan

[73] Assignee: Kokusai Electric Co., Ltd., Tokyo, Japan

[21] Appl. No.: 488,997

[22] Filed: Jun. 8, 1995

[30] Foreign Application Priority Data

Jun. 20, 1994 [JP] Japan .................. 6-159694

[51] Int. Cl.⁶ .................................. H04L 27/12
[52] U.S. Cl. .................................. 315/244; 348/410
[58] Field of Search ...................... 375/244, 242, 375/340; 370/18, 79, 80, 81, 82, 112, 118; 348/409, 410, 411, 412

[56] References Cited

U.S. PATENT DOCUMENTS

| | | | |
|---|---|---|---|
| 4,831,439 | 5/1989 | Fedele et al. | 375/244 |
| 5,440,625 | 8/1995 | Akiyama | 379/244 |

*Primary Examiner*—Stephen Chin
*Assistant Examiner*—Thuy L. Nguyen
*Attorney, Agent, or Firm*—Emmanuel J. Lobato

[57] ABSTRACT

A voice decoding apparatus of an adaptive PCM coding system in which an auxiliary controller is provided between a controller and a prediction coefficient holder. The controller receives a voice activity detection flag b separated from a received demodulated signal a and, at the time of transition from the voice-active duration to the voice-nonactive duration and vice versa, outputs a reset signal d and a signal e indicating whether the voice activity detection flag is voice-active or voice-nonactive. The prediction coefficient holder extracts, from an ADPCM decoder for decoding a coded signal c, a prediction coefficient g, calculates and stores its average value for each frame and updates the old value with the new one and, at the time of transition from the voice-nonactive duration to the voice-active duration, outputs an immediately stored value h. Even when the input flag e changes from the voice-nonactive duration to the voice-active duration, the auxiliary controller keeps outputting a flag f indicative of the voice-nonactive duration for about five frame periods, thereby preventing degradation of the tone quality of the pseudo-background noise which is generated and decoded by the decoder during the voice-nonactive duration.

2 Claims, 4 Drawing Sheets

APPARATUS FOR DECODING A DPCM ENCODED SIGNAL

BACKGROUND OF THE INVENTION

The present invention relates to a voice decoding apparatus and, more particularly, to a voice decoding equipment for decoding received signals encoded by an adaptive differential PCM (ADPCM) scheme.

It is said that the voice activity factor in voice communications is about 35%.

In recent years, there has become widespread what is personal communications intended primarily for private use. The mainstream of such personal communications is voice communications which utilize a terminal equipment handy to carry. A first requirement of such a portable terminal equipment is to be cordless. A second requirement is to cut the circuit power consumption so as to lengthen the service life of the battery that is used for the convenience of portability of the terminal equipment.

Taking into account the voice activity factor, it is possible to reduce the circuit power consumption more than in the past by activating the transmitter circuit for only the voice-active duration and holding it in the sleep mode during the other transmitting operations. This could be implemented by providing a voice activity detecting facility at the sending side and adding a discontinuous transmitter in association therewith.

This, however, creates a problem at the receiving side as the reconstructed voice is discontinuous, and hence is very annoying. As is well-known in the art, a reason for this is that a background noise is transmitted as a modulated signal for only the duration of a sound signal; that is, when the voice is send, the background noise is superimposed on the voice but when no voice is sent, the background noise is not sent either.

A known solution to this problem is to generate, at the receiving side, a pseudo-noise similar to the background noise at the sending side while no voice signal is transmitted.

FIG. 3 illustrates in block form a conventional voice decoding apparatus employing an example of such a scheme as mentioned just above. In FIG. 3, reference numeral 1 denotes an antenna, and 2 a receiving demodulator, which receives and demodulates a modulated wave having multiplexed therein a voice activity detection flag indicating the voice activity of nonactivity detected by a voice activity detector of an encoder at the sending side and ADPCM coding data.

Reference numeral 3 denotes a demultiplexer for demultiplexing the received and demodulated signal a into the ADPCM coding data q and the voice activity detection flag b. Reference numeral 5 denotes a controller, which receives the voice activity detection flag b from the demultiplexer 3 and outputs a control signal (a reset pulse) d and a control signal e indicating the voice activity nonactivity.

Reference numeral 4 denotes an ADPCM decoder, in which a prediction coefficient is reset to "0" by the control signal d from the controller 5 and which decodes the APDCM coding data c for the voice-active duration but, for the voice-nonactive duration, decodes random ADPCM coding data generated therein for pseudo-background noise by a prediction coefficient that is input from a prediction coefficient holder 7.

Reference numeral 7 denotes a prediction coefficient holder, which extracts prediction coefficients which are internal variables of the ADPCM decoder 4, then calculates their average value for each frame, updates the prestored value and, for the voice-nonactive duration, responds to the control signal e from the controller 5 to provide the prediction coefficient of the frame immediately preceding it to the ADPCM decoder 4 while holding the prediction coefficient. Reference numeral 8 denotes a speaker.

FIG. 4 is a timing chart showing a signal waveform of the original sound at the sending side and signal waveforms occurring at respective parts of the voice decoding apparatus.

The uppermost row shows the waveform of the original sound at the sending side; the voice and the background noise are superimposed on each other. The second row shows the voice activity detection flag b sent from the sending side and demultiplexed by the demultiplxer 3; the flag is "1" for the voice-active duration and "0" for the voice-nonactive duration. In this example, the flag is shown to erroneously indicate a voice activity for a short time in the voice-nonactive duration. The third row shows the reset signal d which is provided from the controller 5.

Reference character x at the fourth row denotes a waveform showing temporal variations of a second-order one al(t) of prediction coefficients for the original sound (voice+background noise). Reference character j at the next row denotes a waveform showing temporal variations of a prediction coefficient al(t) of the ADPCM decoder 4; the waveform during the voice-active state is the same as the waveform x, but the waveform during the voice-nonactive state shows temporal changes of the prediction coefficient which is input into the decoder from the prediction coefficient holder 7 to decode the pseudo-background noise.

The operation of the conventional equipment will be described with reference to FIGS. 3 and 4.

The modulated wave with the voice activity detection flag and the ADPCM coding data multiplexed therein is received by the antenna 1 and then fed to the demodulator 2, which demodulates it and applies the demodulated signal a to the demultiplexer 3. The voice activity detection flag herein mentioned is the output signal from the voice activity detector, which detects a period of the input from the encoder of the sending side over which a voice is present (voice-active) or absent (voice non-active).

The demultiplexer 3 demultiplexes the modulated signal into the voice activity detection flag b and the ADPCM coding data c. In this instance, the ADPCM coding data c has a 5-milli-second long frame. For each 5 milli-second the voice activity detection flag b is fed to the controller 5.

The controller 5 receives the voice activity detection flag b and provides the control signal (a reset pulse) d to the ADPCM decoder 4 at the time of transition from the voice-active duration to the voice-nonactive duration and vice versa. The control signal d is to initialize a predetermined variable in the ADPCM decoder 4, such as a prediction coefficient; in this example, the control signal is applied to the decoder to reset it for each transition to put the receiving side decoder into the same internal state as that of the sending side encoder when the transmission is interrupted and resumed in response to the voice activity detection. Without this resetting of the decoder, its internal state would differ from that of the encoder after the interruption of the transmission on the basis of the voice activity detection. This results in the degradation of the tone quality of the reconstructed voice decoded by the decoder. The ADPCM decoder 4 is reset by the control signal d. Since no modulated signal is received during the voice-nonactive period, the ADPCM decoder 4 generates therein random data over a range permissible for the ADPCM coding data c so as to generate pseudo-background noise and decodes the data by the prediction coefficient which is fed from the prediction coefficient holder 7.

To add spectrum information of the actual noise to the pseudo-background noise generated in the ADPCM decoder 4 during the interruption of the transmission, the prediction coefficient holder 7 extracts the prediction coefficients in the ADPCM decoder 4, calculates their average value, updates the old value with the new one and holds the new average value for each time and, upon detection of the voice-nonactive duration by the control signal e, adds the average value of the prediction coefficients of the last frame of the voice-active duration to the pseudo-background noise while holding it. By this, it is possible to generate a pseudo-background noise which, even if decoded using random data, has a timbre similar to that of the background noise actually superimposed on the encoded voice or sound.

As referred to previously, "x" in FIG. 4 shows, for example, temporal variations of the second-order one al(t) of the prediction coefficients for the original sound (voice+background noise).

When a period B in the voice-nonactive duration is processed as a voice-active duration by an error of the voice active detection flange due to a decision error of the voice activity detector or fading transmission medium, etc. as shown in the voice activity detection flag b in FIG. 4, the decoder 4 is reset at the end of the period A of "j" in FIG. 4. The prediction coefficient made "0" by the reset rises up to a value for the background noise over the period B. If the period B becomes the voice-nonactive duration again after an extremely short time (five frames, for instance), the decoder 4 generates the pseudo-background noise in the next period C (the voice-nonactive duration) while holding the old value of the prediction coefficient prior to its rising; hence, in the period C the pseudo-background noise becomes noise of a timbre different from that of the actual background noise, awakening a sense of incongruity in a listener. That is, the prior art has a shortcoming that the pseudo-background noises in the periods A and C differ in tone quality, creating a feeling of discomfort.

THE SUMMARY OF THE INVENTION

An object of the present invention is to provide a voice decoding apparatus which is free from the above-described defect of the conventional ADPCM voice coding system that an unnatural pseudo-background noise is inserted in the voice signal reconstructed at the receiving side.

To attain the above object of the present invention, a voice decoding apparatus according to the present invention, comprising:

a receiving demodulator for receiving and demodulating a signal, which is a multiplex-modulated signal of an ADPCM-coded voice signal and a voice activity detection flag indicating either a voice-active duration or a voice-nonactive duration and is transmitted for only the voice-active duration;

a demultiplexer for demultiplexing the demodulated signal from the receiving demodulator into a coded voice signal and the voice activity detection flag;

a controller for outputting the voice activity detection flag from the demultiplexer as it is and outputting a reset signal for each time when the voice activity detection flag changes from the voice-active duration to the voice-nonactive duration and vice versa;

an adaptive differential PCM decoder for decoding, in a voice-active duration, the coded voice signal from the demultiplexer with reference to a prediction coefficient, which raises up from the zero state reset by the reset signal, and for decoding, in a voice-nonactive duration, random code words generated from inside circuitry thereof, with reference to a prediction coefficient of background noise in the voice-active duration just preceding to the current voice-nonactive duration, thereby to generate pseudo-background noise; and a prediction coefficient holder for receiving the voice activity detection flag from the controller, for receiving, in the voice-active duration, the prediction coefficient from the adaptive differential PCM decoder to calculate an average value thereof for each frame and to store the average value calculated after updating, and for temporarily interrupting, during the voice-nonactive duration, said updating and applying the average value of the prediction coefficient of the voice-active duration just preceding to the current voice-nonactive duration to the adaptive differential PCM decoder as said prediction coefficient of background noise;

characterized by an auxiliary controller, provided between the controller and the prediction coefficient holder, for outputting the voice activity detection flag from the controller intact for respective lasting durations of the voice-active duration and the voice-nonactive duration, and for interrupting the updating of the prediction coefficient by applying the voice activity detection flag to the prediction coefficient holder for a period of time during which the prediction coefficient reset to the zero state in the adaptive differential PCM decoder raises up to a value substantially equal to the prediction coefficient of a voice-nonactive duration just preceding to the current voice-active duration, when the voice-nonactive duration changes to the current voice-active duration, thereby reducing a range of change in the tone quality of the pseudo-background noise, which is caused when the voice activity detection flag received indicates erroneously the voice-active duration for a short time in the voice-nonactive duration.

BRIEF DESCRIPTION OF THE DRAWINGS

The present invention will be described in detail below with reference to the accompanying drawings, in which.

PREFERRED EMBODIMENT OF THE INVENTION

Figure 1:
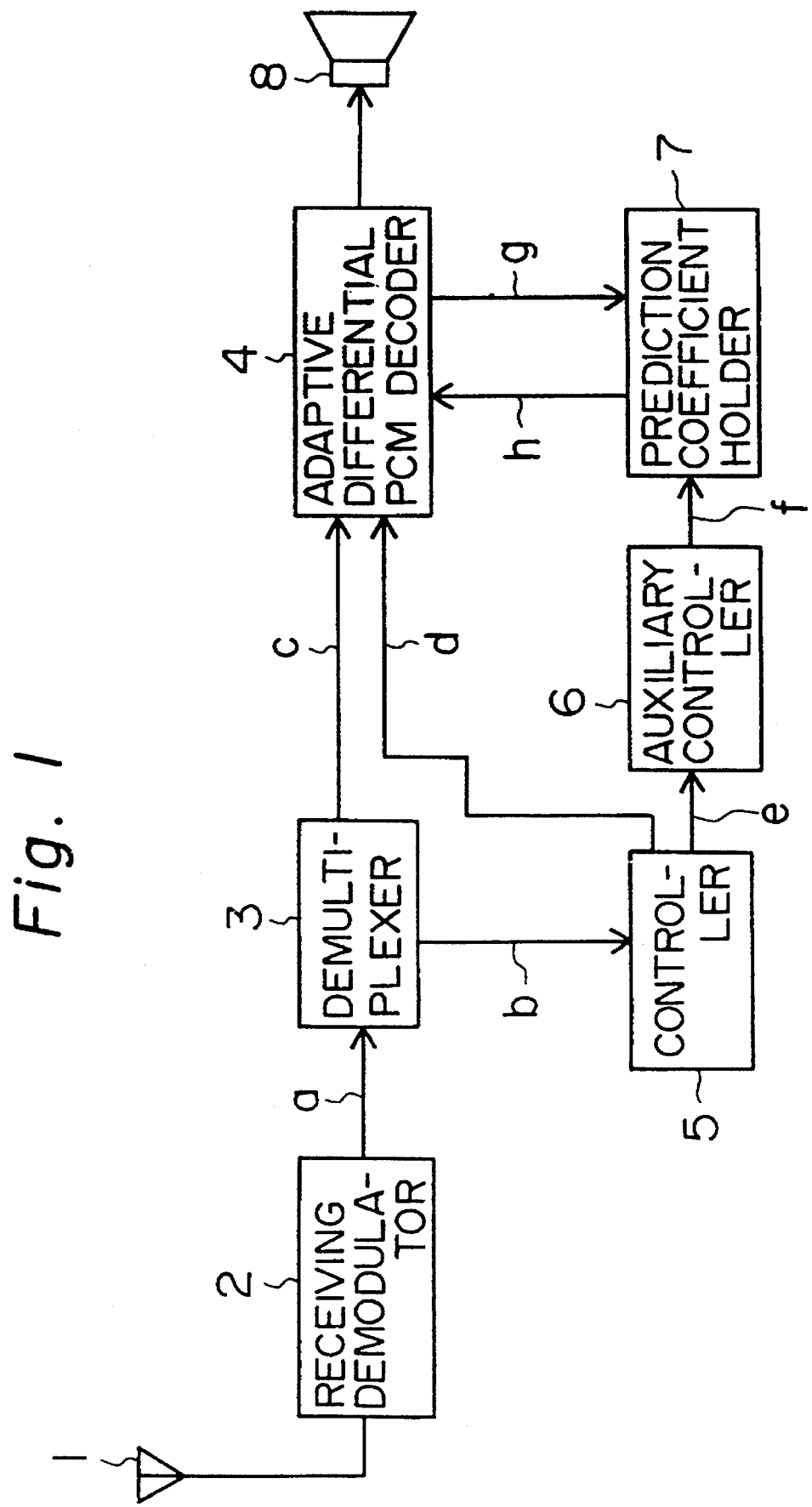
FIG. 1 is a block diagram illustrating an example of the voice decoding apparatus according to the present invention.

In FIG. 1 illustrating in block form an example of the voice decoding apparatus according to the present invention, the antenna 1, the receiving demodulator 2, the demultiplexer 3, the ADPCM decoder 4, the controller 5, the prediction coefficient holder 7 and the speaker 8 are the same as those in the prior art apparatus.

Reference numeral 6 denotes an auxiliary controller which responds to a control signal from the controller 5 to control the operation of the prediction coefficient holder 7.

Reference numeral 7 denotes a prediction coefficient holder which extracts a prediction coefficient g, which is an internal variable of the ADPCM decoder 4, calculates its average value for each frame, responds to a control signal f from the auxiliary controller 6 to perform the storing and updating of the average value and provides the value h to the ADPCM decoder 4.

Next, a description will be given of the operation of the embodiment according to the present invention.

Figure 4:
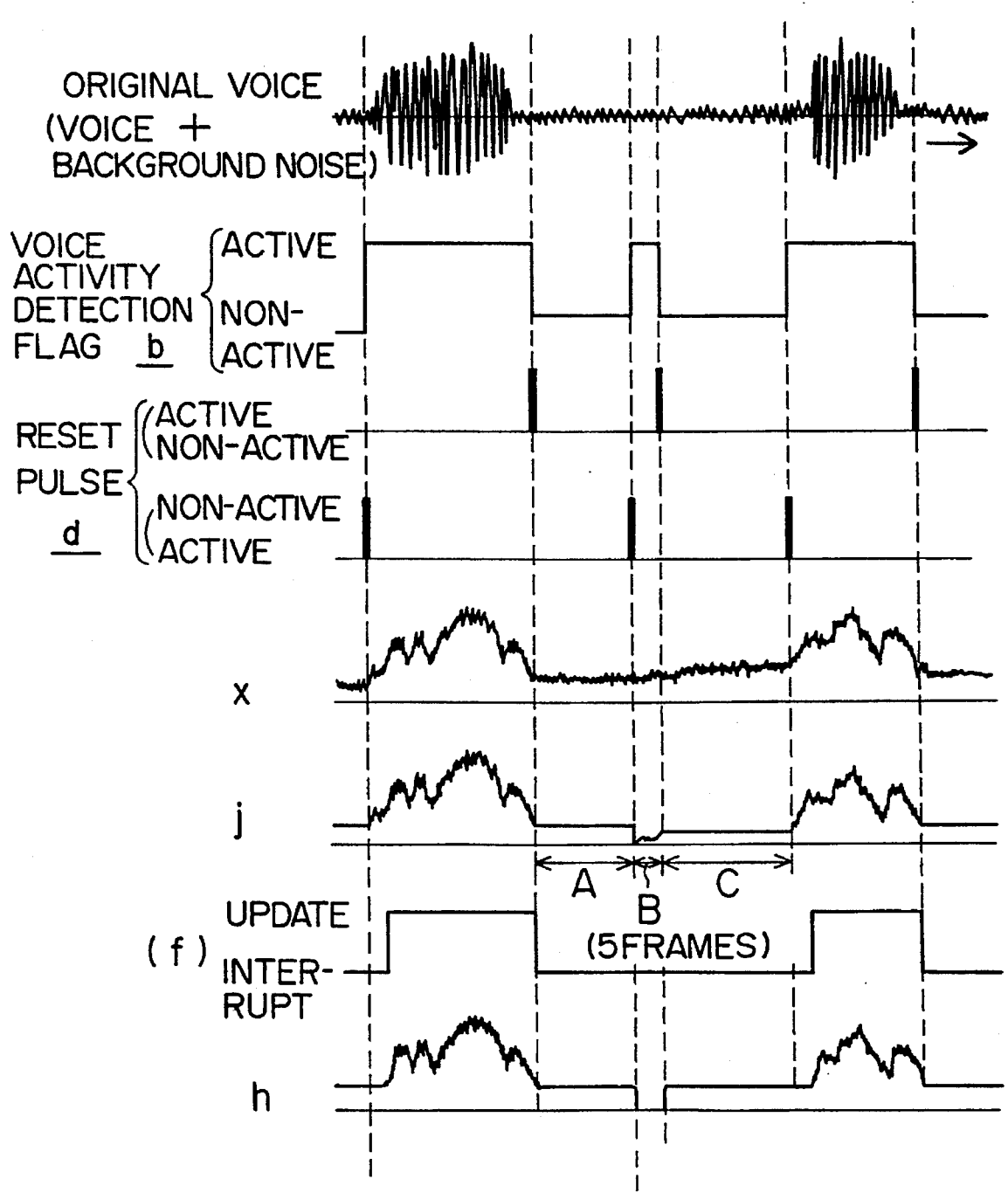
FIG. 4 is a timing chart showing temporal changes of respective signals.

Since this embodiment is identical in operation with the prior art example except the auxiliary controller 6 and the prediction coefficient holder 7, differences from the prior art example will be described with reference to FIG. 4.

The auxiliary controller 6 receives from the controller 5 the control signal e indicating the voice-active or voice-nonactive duration; when the voice-active duration changes to the voice-nonactive duration, the auxiliary controller 6 applies to the prediction coefficient holder 7 a holder updating signal f for interrupting the updating of the prediction coefficient holder 7 until the reset prediction coefficient rises, that is, a voice activity detection flag indicating the voice-nonactive duration. The prediction coefficient holder 7 responds to the holder updating signal f to interrupt the update operation.

Figure 2:
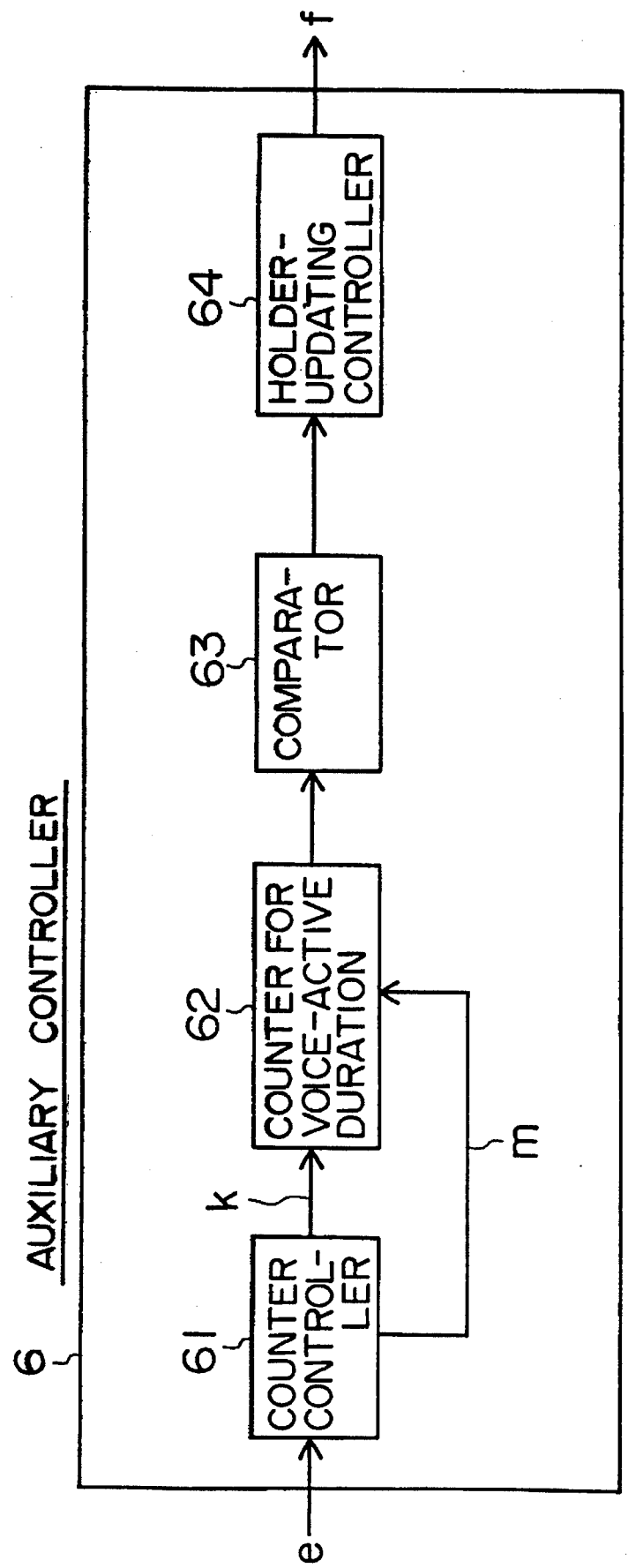
FIG. 2 is a block diagram showing an example of an auxiliary controller which forms a principal part of the present invention.
Figure 3:
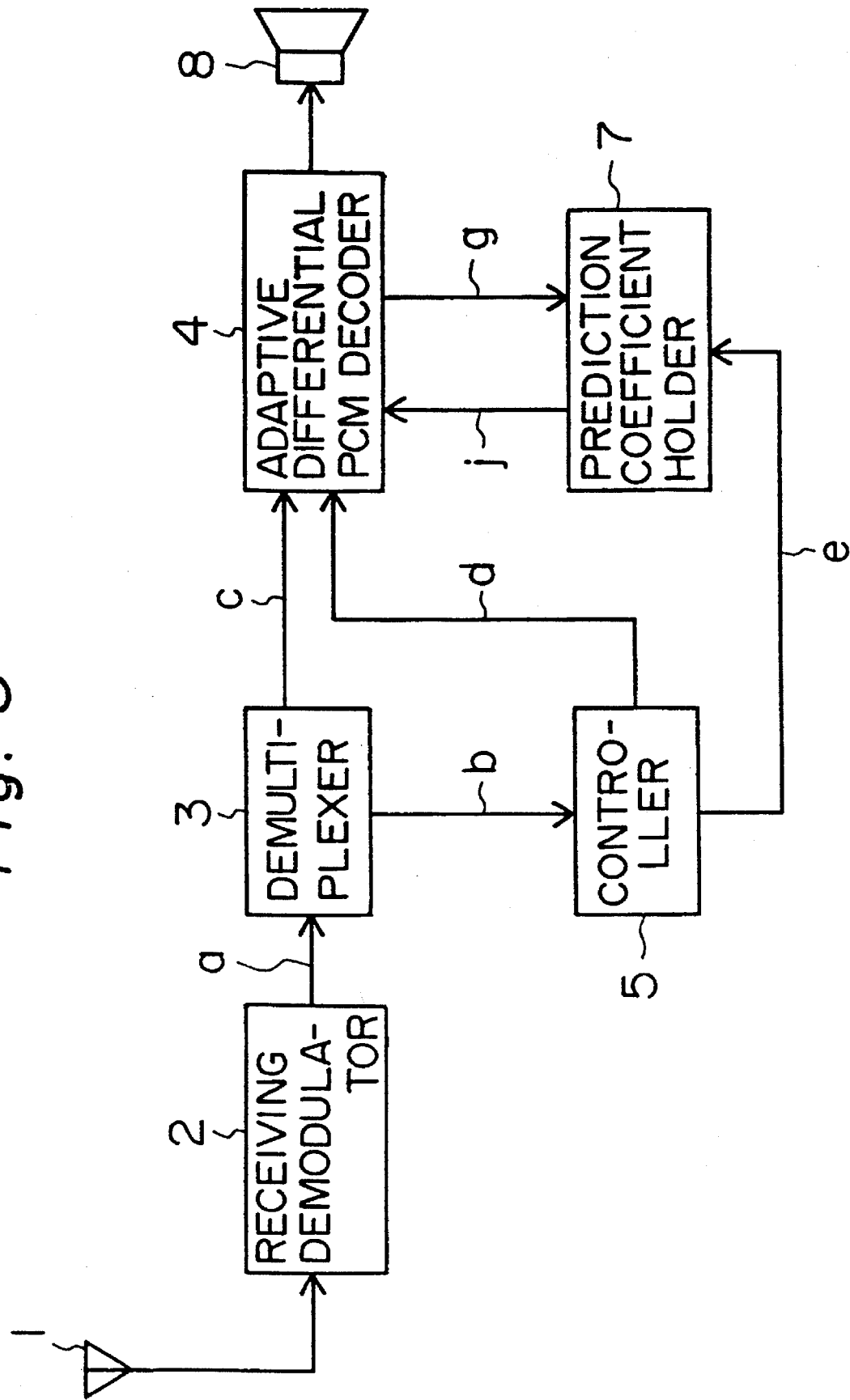
FIG. 3 is a block diagram showing an example of a conventional voice decoding apparatus.

FIG. 2 is a detailed block diagram illustrating the auxiliary controller 6 which forms the principal part of the present invention. In FIG. 2, reference numeral 61 denotes a counter controller which receives the control signal e and updates and resets a counter for a voice-active duration (hereinafter referred to "voice-active duration counter") 62. Reference numeral 62 denotes a voice-active duration counter which counts the voice-active duration. Reference numeral 63 denotes a comparator which compares the counter value of the voice-active duration counter with the value of a predetermined constant and provides the compared output to a holder update controller 64. Reference numeral 64 denotes a holder-updating controller which receives the compared output from the comparator 63 and outputs the holder update signal f.

Next, the operation of the auxiliary controller 6 will be described.

The auxiliary controller 6 outputs the holder update signal f corresponding to the control signal e (the voice activity detection flag) for a time period, except a short time when the voice-nonactive duration changes to the voice-active duration, where the control signal e applied from the controller 5 assumes the voice-active duration and the voice-nonactive duration. When the voice-nonactive duration changes to the voice-active duration, a counting operation of the number of frames is started from the transition to the voice-active duration, while the voice activity detection flag indicating the voice-nonactive duration is still generated as the holder updating signal f in a short time, such as a period of five frames. Accordingly, the updating of the prediction coefficient is temporarily interrupted during five frame periods from the transition to the voice-active duration in the prediction coefficient holder 7 receiving the holder updating signal f.

The time period, in which the holder updating signal f indicating the voice-nonactive duration is still generated, is determined to be a time period at the end of which the value of the prediction coefficient reset to zero in the adaptive differential PCM decoder 4 raises and then becomes equal to the value of the prediction coefficient in a voice-nonactive duration just preceding to the current voice-active duration. Since the distribution and the level of the prediction coefficient vary in accordance with the quality of background noise and since the value of the prediction coefficient of background noise is not so large, the above time period may be determined as a period of about five frames (25 milli-seconds), while it is desirable for obtaining a good effect to determine the time period to be equal to ten frames (50 milli-seconds) in a case where the value of the prediction coefficient is relatively large due to the quality of background noise. However, if the above time period is determined to be more longer, the lowering of speech quality due to speech head cutting in each voice-active duration.

The detailed circuit shown in FIG. 2 is now described.

When applied with the control signal e, the counter controller 61 outputs a counter update signal k to update the voice-active duration counter 62 one by one or outputs a counter reset signal m to reset the voice-active duration counter 62 to zero in a case where the control signal e in each frame indicates the voice-active duration. The voice-active duration counter 62 outputs the counter value to the comparator 63 for each time of updating. In the comparator 63, a numerical value corresponding to a time period at the end of which the value of the prediction coefficient reset to zero in the adaptive differential PCM decoder 4 raises and then becomes equal to the value of the prediction coefficient in a voice-nonactive duration just preceding to the current voice-active duration is established as a comparison constant. By way of example, a number "5" is established in case of five frames (25 milli-seconds). Accordingly, the comparator 63 judges whether the counter value inputted is included in a range of zero to five or exceeds five and outputs the comparison result to the holder update controller 64. The holder update controller 64 controls the prediction coefficient holder 7 in accordance with the comparison result (i.e. the holder update signal f), so that the update operation in the prediction coefficient holder 7 is performed in a case where the result exceeds the number "5" or interrupted in a case where the result is included in a range of zero to five. In other words, the prediction coefficient holder 7 continues the holding of the prediction coefficient during five frames (25 milli-seconds) in a voice non-active duration or even if a voice-nonactive duration changes to a voice-active duration. That is, since such a holder update signal f as indicated by (f) in FIG. 4 is provided, no update operation takes place in the period B of the wave form j in the prior art; consequently, the prediction coefficient values for the voice-nonactive durations A and C becomes successively equal to each other, excluding the possibility of making uncomfortable noise in the voice-nonactive duration.

As described above in detail, even if a voice activity flag erroneously indicating a voice-active duration is received, it is possible to avoid the generation of unpleasant noise by providing the retained prediction coefficient to the pseudo-background noise for the period of time long enough for the prediction coefficient to rise after resetting.

What we claim is:

1. A voice decoding apparatus, comprising:

a receiving demodulator for receiving and demodulating a signal, which is a multiplex-modulated signal of an ADPCM-coded voice signal and a voice activity detection flag indicating either a voice-active duration or a voice-nonactive duration and is transmitted for only the voice-active duration;

a demultiplexer for demultiplexing the demodulated signal from the receiving demodulator into a coded voice signal and the voice activity detection flag;

a controller for outputting the voice activity detection flag from the demultiplexer as it is and outputting a reset signal for each time when the voice activity detection flag changes from the voice-active duration to the voice-nonactive duration and vice versa;

an adaptive differential PCM decoder for decoding, in a voice-active duration, the coded voice signal from the demultiplexer with reference to a prediction coefficient, which raise up from the zero state reset by the reset signal, and for decoding, in a voice-nonactive duration, random code words generated from inside circuitry thereof, with reference to a prediction coefficient of background noise in the voice-active duration just preceding to the current voice-nonactive duration, thereby to generate pseudo-background noise; and a prediction coefficient holder for receiving the voice activity detection flag from the controller, for receiving, in the voice-active duration, the prediction coefficient from the adaptive differential PCM decoder to calculate an average value thereof for each frame and to store the average value calculated after updating and for applying the average value of the prediction coefficient to the adaptive differential PCM decoder, and for temporarily interrupting, during the voice-nonactive duration, said updating and applying the average value of the prediction coefficient of the voice-active duration just preceding to the current voice-nonactive duration to the adaptive differential PCM decoder as said prediction coefficient of background noise;

characterized by an auxialiary controller, provided between the controller and the prediction coefficient holder, for outputting the voice activity detection flag from the controller intact for respective lasting durations of the voice-active duration and the voice-nonactive duration, and for interrupting the updating of the prediction coefficient by applying the voice activity detection flag to the prediction coefficient holder for a period of time during which the prediction coefficient reset to the zero state in the adaptive differential PCM decoder raises up to a value substantially equal to the prediction coefficient of a voice-nonactive duration just preceding to the current voice-active duration, when the voice-nonactive duration changes to the current voice-active duration, thereby reducing a range of change in the tone quality of the pseudo-background noise, which is caused when the voice activity detection flag received indicates erroneously the voice-active duration for a short time in the voice-nonactive duration.

2. A voice decoding apparatus according to claim 1, in which said period of time is determined to be equal to five frames of the multiplex-modulated signal.

* * * * *